Aug. 21, 1956    J. YOUNG ET AL    2,759,831
CONFECTION PACKAGE
Filed Jan. 4, 1955
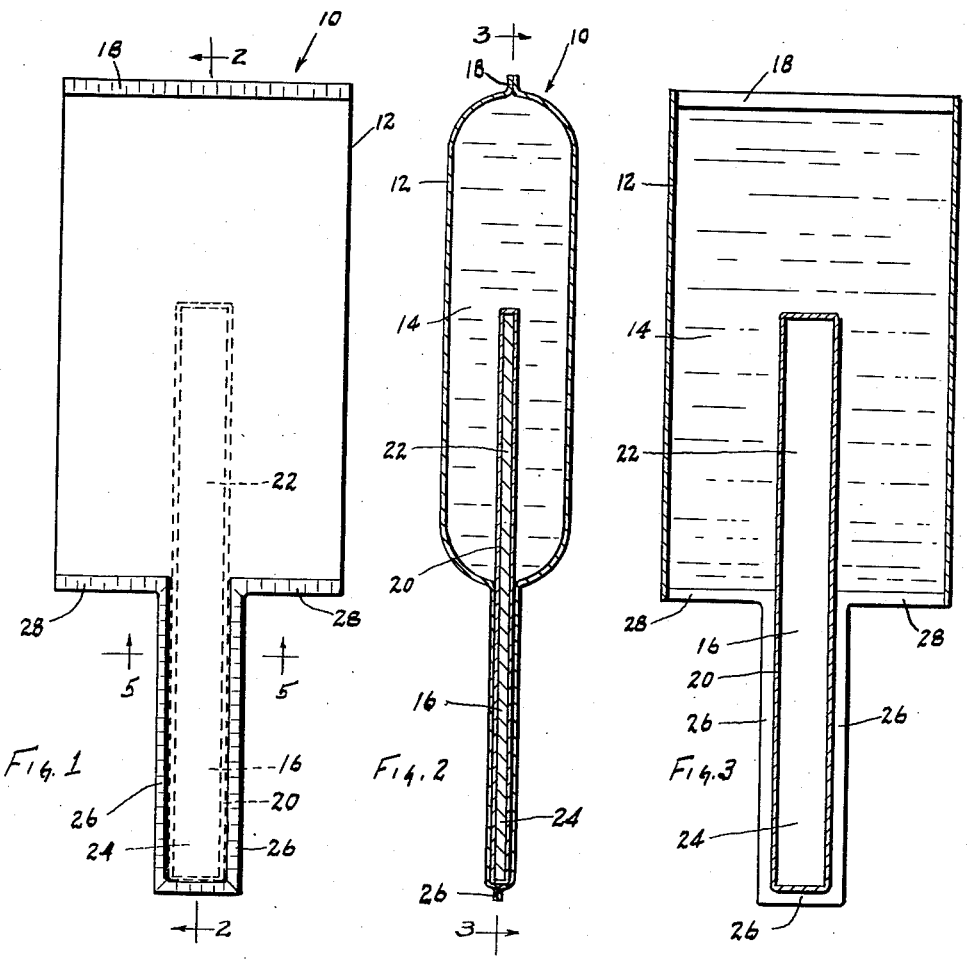
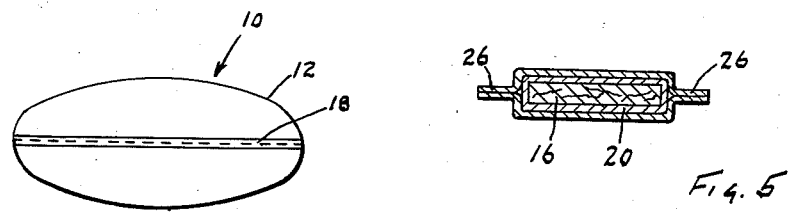
INVENTORS
JULIUS YOUNG
BENJAMIN W. COLMAN
BY
ATTORNEY

United States Patent Office 2,759,831
Patented Aug. 21, 1956

2,759,831
CONFECTION PACKAGE

Julius Young, Detroit, and Benjamin W. Colman, Berkley, Mich.

Application January 4, 1955, Serial No. 479,783

4 Claims. (Cl. 99—180)

This invention relates to a confection package, and more particularly to a sealed pouch package in which the confection material is contained as a liquid to be frozen at a time substantially beyond that at which the package is produced, and further contains the supporting handle or stick, which when frozen into the confection supports the same as a complete confection unit.

This invention relates to the inventions disclosed and claimed in copending applications of Benjamin W. Colman, entitled "Confection Package," Serial No. 444,725, filed July 21, 1954, and Serial No. 447,966, filed August 5, 1954.

The confection package of this invention provides for enclosing a confection liquid material, such as a dilute aqueous fruit syrup solution in a plastic tube or pouch, sealed at both ends. Within the pouch and projecting into the liquid portion is the supporting stick, which is preferably of wood coated with a wax-type material to make it water impervious. The pouch material is sealed completely about and around the stick, closely near one end so that a handle is provided totally or substantially free of the liquid, the balance of the wax coated handle projecting freely into the liquid portion of the pouch to be frozen firmly therein.

The confection material, preferably in liquid form, is completely sealed within the pouch or tube. The package is produced, transported and sold without refrigeration, the confection material being of a type or types, well known in the art, that have a high resistance to decomposition, deterioration and spoilage at room temperatures.

When the consumer purchases the package at the store, it is taken home and stored until used. To use the package, it is simply placed in the freezing section of a refrigerator and frozen solid. The aqueous solution freezes about the handle which becomes a support for the frozen confection. In order to consume the confection, the plastic outer film pouch is stripped down from the top, the handle remaining frozen within the confection material to support it upright.

At the present time, the frozen stick confections sold by street trucks or in stores are of a type that are produced, transported and sold in refrigerated condition, a method that requires costly refrigerating equipment and storage facilities. When sold through street trucks, children are subject to traffic accidents, which should be avoided as much as possible. Another objection to street selling of the frozen stick confections is that the sales seem to take place just before or at meal times. This interference with the eating habits of the children raises a serious problem for some mothers.

The plastic pouch material is preferably a combination of heat sealable polyethylene on cellophane, either as a lamination or a coating. The handle is preferably a hard wood stick, coated with a wax type material, such as waxes, paraffins, polyethylene, or other water impervious coatings.

The objects of the invention are directed toward a completely sealed plastic pouch containing a confection liquid and a stick handle which, when the liquid is frozen thereabout, supports the frozen liquid as a stick confection.

Additional objects of the invention and features of construction will become more apparent from the description given below. Referring now to the drawing annexed hereto and forming an integral part of this specification, Fig. 1 is a front elevational view of the inventive confection package here disclosed.

Figs. 2 and 3 are vertical sectional views taken substantially on the lines 2—2 and 3—3 of Figs. 1 and 2, respectively.

Fig. 4 is a top plan view of the package of Fig. 1.

Fig. 5 is a horizontal sectional view taken substantially on the line 5—5 of Fig. 1.

As shown in the several views of the drawing, the liquid freezable confection package 10 comprises an outer pouch 12, a confection liquid 14 therein contained, and a handle 16 also contained in the pouch 12.

Pouch 12 preferably consists of an outer layer of cellophane and an inner coated or laminated layer of polyethylene. Pouch 12 is closed off at the top by heat sealing the top edges 18 together, at suitable heat sealing temperatures and by suitable heat sealing means, both well known in the art.

Handle 16, if wood, is preferably provided with an outer layer of a wax type material 20, being water impervious to prevent wicking, among its several advantages. The upper portion 22 of coated stick handle 16 projects freely into the liquid portion of the pouch 12. The lower stick portion 24 projects or depends below the liquid portion of the pouch and is closely encased and sealed about by the pouch film, which is arranged as a flange 26 about the lower stick portion 24. If the wax coating 20 is thick enough and flange 26 is heat sealed closely enough to the coated handle, confection liquid 14 may be sealed off from the lower stick portion 24. The pouch lower edges 28 of the liquid pouch portion on both sides of the stick handle, and above flange 26, are head sealed together, totally enclosing the confection liquid 14 and the handle 16.

Waxes, including the micro-crystalline waxes, are highly compatible with polyethylene and are heat sealable with polyethylene.

Sealing of the pouch edges 18 and 28 may be done with hot bar sealers or thermal impulse sealers, or such other equipment as is recommended by the pouch film producers. At present, pouch forming and heat sealing equipment is well known in the art and readily available.

The confection material 14 is preferably a sugary aqueous solution of a fruit syrup. Other liquid freezable material may also be used in package 10. However, the invention is not to be considered as limited to any particular liquid material. Such materials as are flowable into pouch 12 may be embodied in the package structure 10. These materials may be viscous in nature to a greater or lesser degree; they may be semi-solids or semi-liquids. An example may be smooth confection fudge which is flowable at or slightly above normal room temperatures and which can be frozen solid upon handle 16.

The package 10 is put into use simply by placing it into the freezing compartment of a refrigerator. The liquid 14 freezes solid around the upper stick portion 22, converting the package into a frozen stick confection. The upper portion of pouch 12 is torn open and slipped down around the frozen liquid 14, for access thereto. As the frozen confection is gradually consumed, the pouch film may be progressively drawn down until the entire confection is eaten. Or, the pouch may be removed completely ab initio from the frozen stick supported confection.

The stick handle 16 may or may not be coated with wax or similar water impervious material. If the stick is wood, it is preferred that it be coated as above described, in order to prevent wicking of the liquid by the stick. If the stick handle 16 is made of other material which is inherently water or liquid impervious, or, if not, is not subject to deterioration or contamination, it may also be embodied in the instant structure without any coating, and will perform and function as desired. An example of such a material would be rigid polystyrene or similar plastic.

Having described our invention in its simplest terms, it is to be understood that the details of construction may be changed and varied in greater or lesser degree without departing from the essence of the invention or from the scope of the appended claims.

We claim:

1. A freezable confection package designed to be produced, shipped, stored and sold at room temperatures comprising a heat sealable film pouch formed of an outer layer of cellophane coated with an adherent layer of polyethylene, a freezable confection liquid in the form of a sugary aqueous solution of a fruit syrup contained and sealed within said pouch, and a handle for said confection material when frozen contained and sealed within said pouch, said handle having an upper portion immersed in said confection liquid and a lower portion completely and closely encased by a portion of said film pouch, to provide a manually grippable sealed-in handle portion distinct from said liquid filled pouch.

2. A freezable confection package designed to be produced, shipped, stored and sold at room temperatures comprising a heat sealable film pouch formed of an outer layer of cellophane coated with an inner adherent layer of heat sealable polyethylene, a freezable confection fudge material contained and sealed within said pouch at room temperature, and a handle for said confection material when frozen contained and sealed within said pouch, said handle having an upper portion immersed in said confection material and a lower portion completely and closely encased by a portion of said film pouch, to provide a manually grippable sealed-in handle portion distinct from said confection material containing pouch.

3. A freezable confection package designed to be produced, shipped, stored and sold at room temperatures comprising a sealed film pouch formed of an outer layer of cellophane coated with an inner adherent layer of heat sealable polyethylene, a freezable confection material in the form of a sugary aqueous solution of a fruit syrup at room temperature contained and sealed within said pouch, and a wooden handle for said confection material when frozen coated with a material impervious to said confection material and contained and sealed within said pouch, said handle having an upper portion immersed in said confection material and a lower portion completely and closely encased by a portion of said film pouch, to provide a manually grippable sealed-in handle portion distinct from said confection material containing pouch.

4. A freezable confection package designed to be produced, shipped, stored and sold at room temperatures comprising a heat sealable cellophane-polyethylene film pouch, a freezable confection material of the group consisting of a sugary aqueous solution of a fruit syrup and a confection fudge contained and sealed within said pouch, and a handle for said confection material when frozen contained and sealed within said pouch, said pouch having a portion thereof completely and closely encasing the lower portion of said handle, the upper portion of said handle being immersed in said confection material, to provide a manually grippable sealed-in lower handle portion distinct from said confection material containing pouch.

References Cited in the file of this patent

UNITED STATES PATENTS

| | | |
|---|---|---|
| 1,882,290 | Meagher | Oct. 11, 1932 |
| 2,450,364 | Smith | Sept. 28, 1948 |
| 2,627,472 | Valenta | Feb. 3, 1953 |

OTHER REFERENCES

"The Ice Cream Review," December 1953, page 106.
"Refrigerating Engineering," February 1954, page 46, article entitled Packaging and Wrapping Materials.